March 8, 1949.
M. B. CARROLL
2,463,950
GEAR TYPE ROTARY PUMP AND MOTOR HYDRAULIC TRANSMISSION
Filed July 20, 1944
4 Sheets-Sheet 1
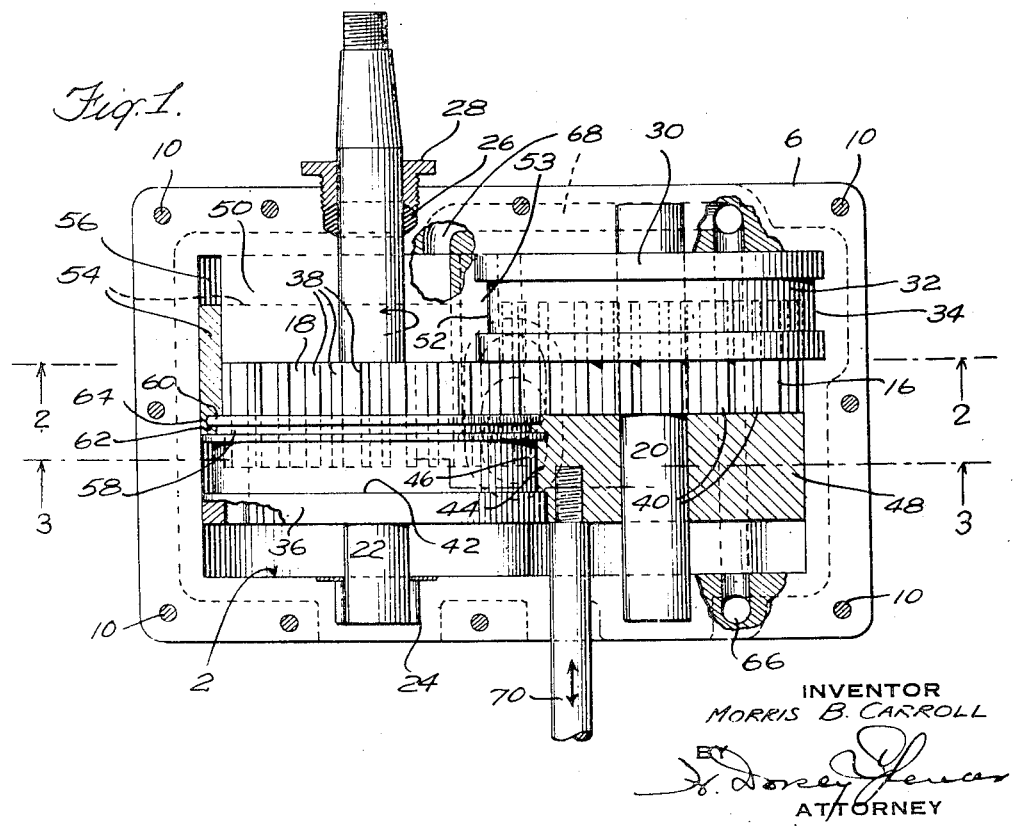
INVENTOR
MORRIS B. CARROLL
ATTORNEY March 8, 1949.　　　　M. B. CARROLL　　　　2,463,950
GEAR TYPE ROTARY PUMP AND MOTOR
HYDRAULIC TRANSMISSION
Filed July 20, 1944　　　　　　　　　　　4 Sheets-Sheet 2
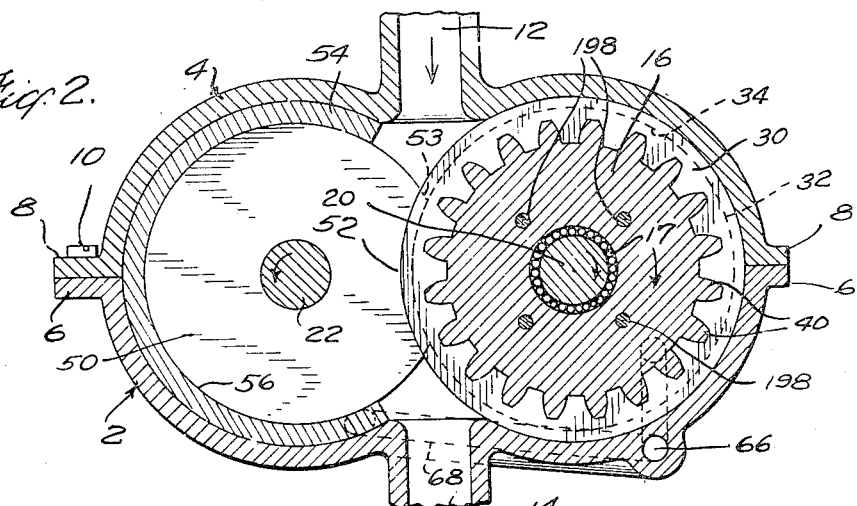
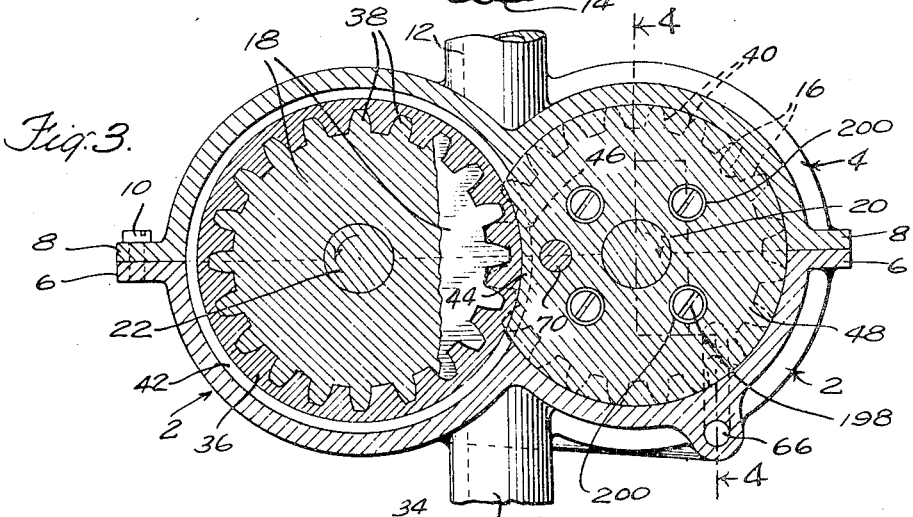
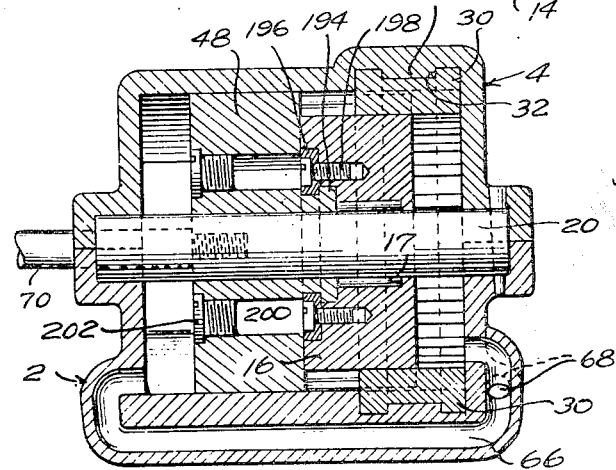
INVENTOR
MORRIS B. CARROLL
ATTORNEY

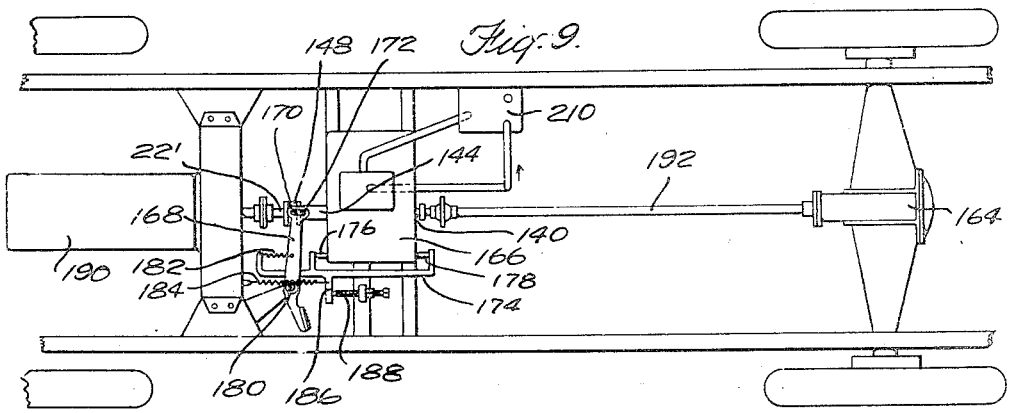
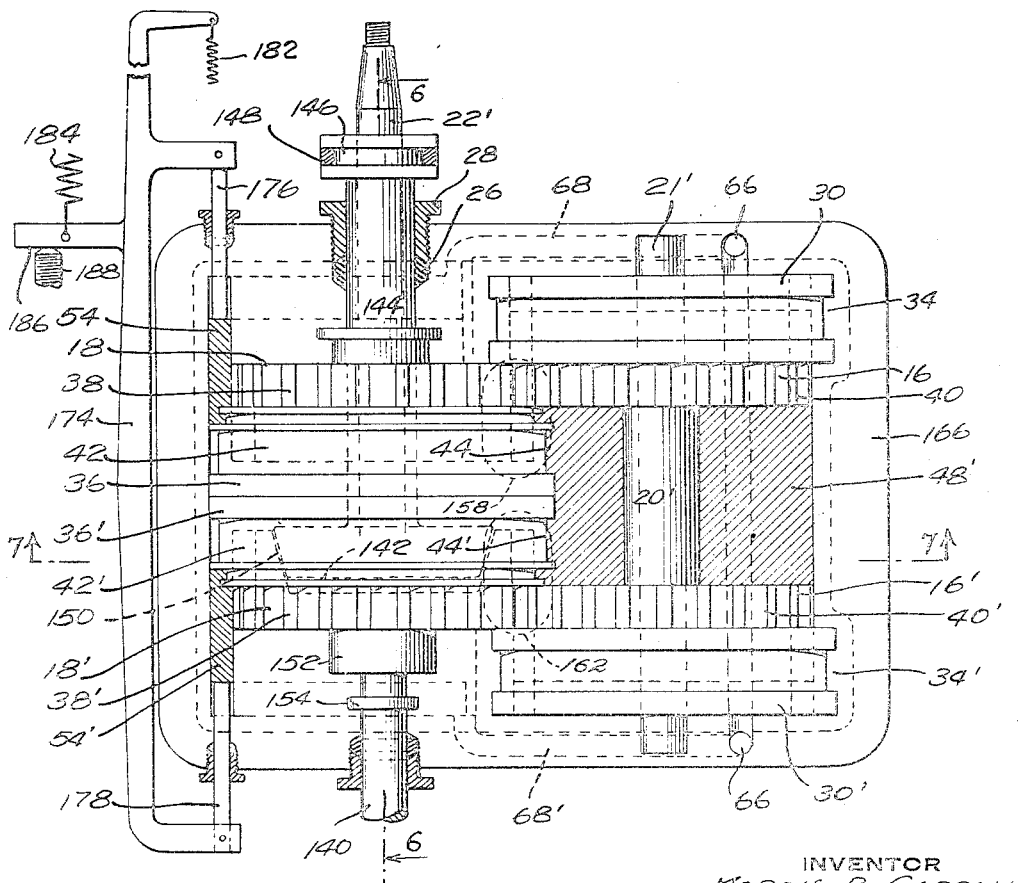

March 8, 1949.　　M. B. CARROLL　　2,463,950
GEAR TYPE ROTARY PUMP AND MOTOR
HYDRAULIC TRANSMISSION
Filed July 20, 1944　　　　4 Sheets-Sheet 4
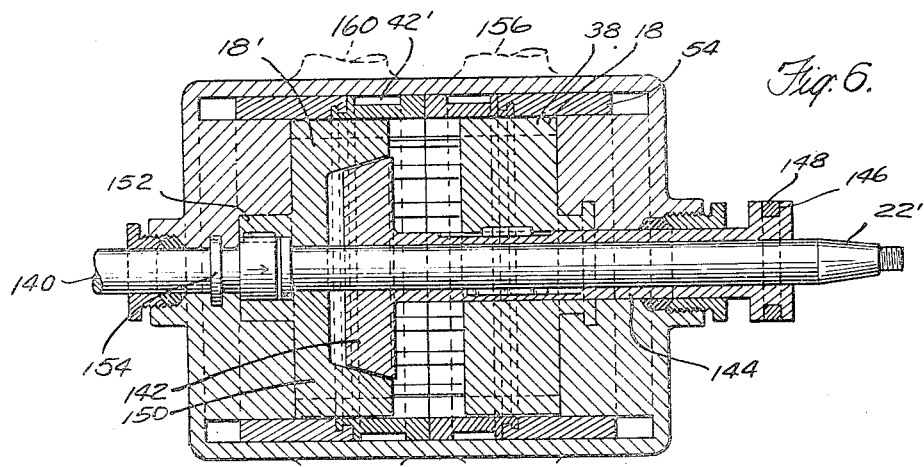
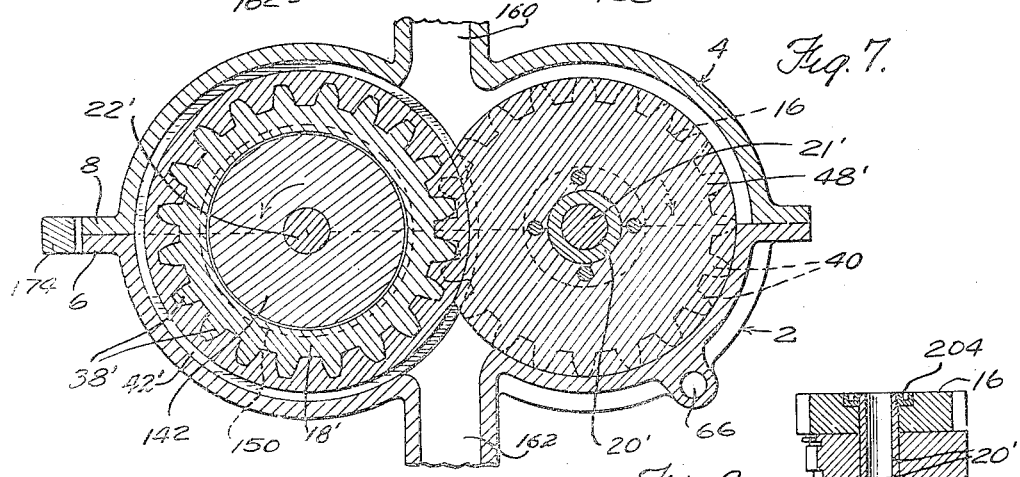
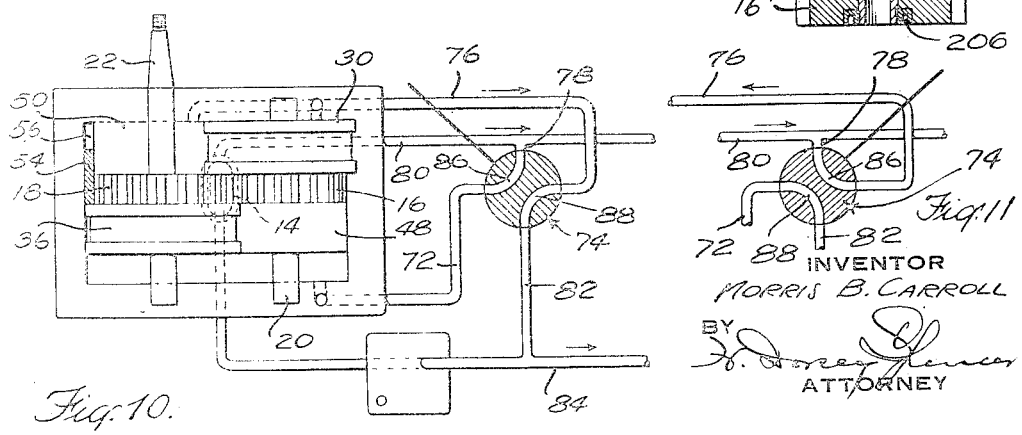
INVENTOR
MORRIS B. CARROLL
BY
ATTORNEY Patented Mar. 8, 1949

2,463,950

UNITED STATES PATENT OFFICE 2,463,950

GEAR TYPE ROTARY PUMP AND MOTOR HYDRAULIC TRANSMISSION

Morris B. Carroll, Westfield, N. J., assignor of twenty-five per cent to H. Dorsey Spencer, New York, N. Y.

Application July 20, 1944, Serial No. 545,856

7 Claims. (Cl. 60—53)

This invention relates to hydraulic transmissions and particularly to hydraulic transmissions of the type in which a positive displacement pump, associated with the driving mechanism, supplies fluid under pressure to a positive displacement hydraulic motor associated with the driven mechanism and in which the speed of the motor and the torque delivered by it are varied primarily either by varying the displacement of the pump at constant speed or by varying the displacement of the motor at constant pump displacement or by simultaneously varying the displacements of both.

A general object of the present invention is to provide a hydraulic pump or motor, having particular utility in hydraulic transmissions of the aforementioned type, which is simple in construction and efficient in operation and which is provided with simple, positive and efficient means for effecting any desired variations of its speed and torque ratios between their maximum and minimum values.

More particularly the invention aims so to interconnect a pump and a motor of like design to form a hydraulic transmission operating in such manner that as the capacity of the pump is increased the capacity of the motor is proportionately decreased, and vice versa, thus amplifying the variations in speed. To this end the invention is directed to a hydraulic transmission in which a pump and a motor, each having two rotary intergeared pistons provided with close-fitting sheaths relatively slidable axially to expose in effective position more or less of the piston faces and each mounted in a casing, having intake and discharge ports and piston bearings, in such manner that the casing provides space for simultaneous axial movement of one sheath, while its piston maintains its position in said casing, and for axial movement of the other piston, while its sheath maintains its position in said casing, are so interconnected that the axially movable piston of the motor is connected to and movable axially with but rotatable independently of the axially movable piston of the pump and that the axially movable sheath of the pump is connected to and movable axially with but rotatable independently of the axially movable sheath of the motor.

An important feature of the invention is the possibility of combining with the hydraulic transmission a positive clutch for direct connection of the driving and driven parts when the desired speed has been attained.

Other objects and important features of the invention will appear from the following description and claims when considered in connection with the accompanying drawings, in which—

Figure 1 is a plan view, with some parts shown in section, of a hydraulic pump or motor embodying novel features of the present invention, the top half of the pump or motor casing being removed;

Figure 2 is a section on the line 2—2 of Figure 1;

Figure 3 is a section on the line 3—3 of Figure 1;

Figure 4 is a section on the line 4—4 of Figure 3;

Figure 5 is a plan view with some parts shown in section of a hydraulic pump and a hydraulic motor, each embodying important novel features of the present invention and both so included in a single housing as to be operable in unison to increase or decrease the displacement of one, while at the same time a substantially corresponding decrease or increase in the displacement of the other is effected, whereby the unit thus provided may be substituted for the transmission gear box of a motor vehicle or other variable speed transmission device;

Figure 6 is a section on the line 6—6 of Figure 5;

Figure 7 is a section on the line 7—7 of Figure 5;

Figure 8 is a detail section in reduced scale illustrating the manner of mounting the pump and motor gears on a common slidable shaft;

Figure 9 is a diagrammatic view showing a transmission, such as illustrated in Figure 5, incorporated in a motor vehicle;

Figure 10 is a diagrammatic view showing how the relative movements of the gears and their associated sheaths, to vary the displacement of the pump or motor, may be effected hydraulically, and Figure 11 is a detail of the hydraulic means of Figure 10 showing the 2-way valve in its other position.

In Figures 1 to 4 inclusive, which illustrate a single unit of the combination to which the invention particularly relates and which may be used either as a variable displacement hydraulic pump or as a hydraulic motor of variable displacement, the pump or motor shown is of the gear type. Although, for convenience of illustration, the gears shown have the faces of their teeth extending parallel to the gear axis, it will be understood that the invention is not limited to gear pumps necessarily having teeth of the illustrated character, since it is equally applicable to any type of gear pump in which a sheath may be caused to slide lengthwise of the gear teeth in a direction parallel to the gear axis.

As herein illustrated, the pump or motor comprises a housing or casing which may be formed in two pieces, 2 and 4, having lips or flanges 6 and 8 for receiving bolts or screws 10 by which the two parts of the housing or casing are secured together. The housing or casing is also provided with an intake port 12 and a discharge port 14 for the liquid which serves to operate, or which is operated upon by, the motor or pump.

The pump pistons, or motor rotors, comprise intermeshing gear wheels 16 and 18, the gear wheel 16 being arranged to turn freely on and to slide lengthwise of a stationary shaft 20 having its ends mounted in the pump or motor housing and preferably not extending therethrough, while the gear 18 is keyed to the shaft 22 to turn therewith and is fixed in its lengthwise position thereon, the shaft 22 having one bearing 24 entirely within one wall of the pump or motor housing while the other bearing is provided with a stuffing box 26 and gland 28 to permit extension of the shaft through the opposite wall of the housing for connection either with a driving part or with a part to be driven, according to whether or not the device is to be used as a pump or as a motor.

To provide for varying the displacement of the pump or motor, each of the gears 16 and 18 is provided with a complementary sheath having inwardly extending teeth which fit between the teeth of the associated gear so that by sliding the sheath lengthwise of the axis of the gear or sliding the gear lengthwise of the axis of the sheath the total amount of piston surface or impact surface of the gear which is exposed may be varied. It will be obvious that it is practically essential for efficient operation that the variations in the piston surfaces of the two intermeshed gears of the gear pump or motor be varied substantially equally and in the same direction so that the torque will be equal on the two gears.

To secure this effect the invention provides for sliding one of the sheaths over its associated gear to cover or uncover more or less of the piston faces of the gear and at the same time to slide the other gear into or out of its associated sheath to cover or uncover more or less of its piston faces, the last mentioned gear also sliding relatively to the gear which is fixed against sliding movement so that the engaging areas of the two gears will be equal. As herein illustrated, and particularly as shown in Figure 1 of the drawings, the sheath 30 for the gear 16, which necessarily turns with the gear 16, is fixed against sliding movement in the pump or motor housing 2, 4. The illustrated means for providing for turning movement of the sheath 30 while preventing its sliding movement comprises a peripheral groove 32 in the sheath 30 into which fits a tongue 34 formed on the inside of the housing.

The sheath 36 for the gear 18, which is arranged to move lengthwise of the axis of the gear 18, to sheath or unsheath more or less of the piston faces of the teeth 38 of the gear 18, at the same time that the gear 16 is being moved lengthwise of its shaft 20 to unsheath or sheath more or less of the piston faces of the teeth 40 of said gear 16 by withdrawing them from or inserting them within the sheath 30, is also arranged to turn with its associated gear while maintaining its adjusted position in the housing 2, 4. To this end the sheath 36 is also provided with a groove 42 which engages a tongue 44 in a concave recess 46 in a block 48. The block 48 is connected to and slides with the gear 16 on the shaft 20 and fits closely within the housing so that it forms a closure for one end of each of the interstices between the non-engaged gear teeth 40 of the gear 16. The connection between the block 48 and gear 16 permits the gear 16 to turn on the shaft 20 while the block 48 is held against rotation, as hereinafter more fully described.

The housing 2, 4, is so formed that a fixed block 50, similar to the slidable block 48 but forming an integral part of the housing and through which the shaft 22 extends and in which it has a part of its bearing, forms a stationary closure for the interstices between the non-engaged teeth 38 of the non-slidable gear 18. This fixed abutment closure 50 for the interstices between the non-engaged teeth 38 of the gear 18, like the sliding block 48, has a concave recess 52 to accommodate the rotating sheath 30 for the gear 16. The fixed block 50 also has a tongue or rib 53 entering the groove 32 of sheath 30. To form a peripheral closure for the interstices between the teeth 38 of the gear 18 that will be effective in all positions of the sheath 36, a segment 54 of a cylinder is provided, of such axial length that it provides throughout its angular extent a peripheral closure for the interstices between the teeth 38 of the gear 18 in any adjusted position of the sheath 36, this segment being received in a correspondingly shaped recess 56 between the fixed block 50 and the surrounding portion of the housing. As shown in Figure 2, the segment 54 needs to extend only to the vicinity of the port 12 at one end of its angular extent and to the vicinity of the port 14 at the other end thereof.

To provide for movement of the segment 54 with the sheath 36, the sheath 36 may be formed with a second groove 58, the outer wall 60 of which is of reduced diameter so that a tongue 62 on the segment 54 may fit into the groove 58 on the sheath 36 and the outer wall 60 of the groove 58 may fit into a groove 64 in the sheath 54 thus connecting the segment 54 to the sheath 50 for sliding movement in respect to the gear 18, while at the same time permitting the sheath 36 to turn with the gear 18 within the segment 54. It will also be noted, as above pointed out, that the sheath 36 forms a closure for the sides of the interstices between the gear teeth 38 which are opposite to the sides closed by the block 50 and that the sheath 30 forms a closure for the sides of the interstices between the teeth 40 of the gear 16 which are opposite to those closed by the block 48 which slides with the gear 16. The peripheral closure for the interstices between the teeth 40 of the gear 16 is constituted by the housing itself, this being made possible by the fact that the gear 16 slides within its peripheral enclosure while in the case of the gear 18 the peripheral closure slides over the gear thus making necessary the use of the segment 54.

To permit displacement of the liquid within the housing 2, 4, when the relative movement of the gears and sheaths of the gear pump or motor is effected to vary the capacity of the pump or motor, by-passes are provided in the housing 2, 4 to permit the liquid between the outer faces of the block 48 and the sheath 36 on the one hand and the inner wall of the housing 2, 4 on the other to move from this space into the space between the opposite wall of the housing and the inside of the sheath 30 and also into the space vacated by the segment 54 or vice versa. As herein shown, a by-pass 66, formed in the housing section 2, has one end communicating with the space between the outer faces of the block 48 and sheath 36 on the one hand and the inner wall of the housing on the other hand and its other end communicating with the interior of the sheath 30. A branch 68 of the by-pass 66, formed in the stuffing-box wall of the housing, communicates with the recess 56 which receives the segment 54.

The relative movement of the gears and sheaths may be effected either mechanically or hydraulically. If the movement is to be effected mechanically, a rod 70, extending through the wall of the housing 2, 4 opposite to that in which the stuffing box 26 is formed, may be connected to the block 48 so that sliding movement of the rod 70 through the housing wall will effect movement of the block 48 and with it the gear 16 to cause more or less of the piston faces of the gear 16 to be exposed, the block 48, by reason of the projection of the tongue 44 into the groove 42 of the sheath 36, carrying with it the sheath 36 and thus causing a corresponding covering or exposure of the piston or impact faces of the teeth of the gear 18.

In Figure 10 is shown a simple arrangement for effecting the relative shifting of the gears and sheaths hydraulically. In Figure 10, instead of by-passing the liquid from one side of the housing 2, 4 to the other through the by-pass 66, the opening into the space between the outer faces of the block 48 and sheath 36 and the inner wall of the housing is connected to a conduit 72 leading to a 2-way valve 74 and the opening into the space between the other wall of the casing and the inside of the sheath 30 is connected with a conduit 76 also leading to the 2-way valve 74, this 2-way valve 74 also having a connection 78 to the discharge conduit 80 from the pump or motor and another connection 82 to the input conduit 84 to the pump or motor. By turning the valve 74 so that its pass 86 connects the conduit 72 with the discharge conduit 80 and its pass 88 connects the conduit 76 with the conduit 82 and the intake conduit 84, if the device is operating as a pump, pressure will be exerted to effect a shifting upwardly in Figure 10, thus reducing the volumetric capacity or displacement of the pump. If the valve 74 be turned to the position shown at the right in Figure 11 so that the pass 86 connects the conduit 80 with the conduit 76 and the pass 88 connects the conduit 72 with the conduit 82 and intake conduit 84, then the pressure is exerted in a direction to cause a shift downward, with the result that more of the piston faces of the teeth of the gear 16 and 18 are uncovered and the volumetric capacity or displacement of the pump or motor is increased.

In Figures 5 to 8 inclusive, the invention is shown as embodied in a combination of a variable displacement pump and a variable displacement motor arranged within a common housing. Such a combined unit may conveniently take the place of the usual variable speed transmission for motor vehicles, lathes and other machinery where gradual variations in speed and torque are desired.

Figure 9 illustrates diagrammatically this form of the invention substituted for the usual variable speed transmission of a motor vehicle.

For convenience in relating the parts of the embodiment of the invention illustrated in Figures 5 to 8 inclusive to the parts of the embodiment of the invention illustrated in Figures 1 to 4 inclusive, the parts so far as possible will be given similar reference numerals, the numbers of the duplicate parts being primed. Referring to Figure 5 two gears 16 and 16' are so mounted on a hollow shaft 20' slidable on a shaft 21' extending into but not through the two sides of the casing or housing that these gears may slide with said hollow shaft 20', together with a block 48' also mounted on the hollow shaft but not rotatable thereon, said block 48' serving to close one side of the interstices between the non-engaged gear teeth 40 and 40'. As the two gears 16 and 16' slide, together with their common block 48', with the hollow shaft 20' on the shaft 21', if the sliding movement be downward in Figure 5, the gear 16 will slide out of its sheath 30 and the gear 16' will slide into its sheath 30', these sheaths being mounted, as in the embodiment of the invention illustrated in Figures 1 to 4, to turn with the gears but being held by tongues 34 and 34' against movement along the axis of the shaft 21'.

The gears 18 and 18', which mesh respectively with the gears 16 and 16', are fixed, as in the form of the invention illustrated in Figures 1 to 4 inclusive, against movement lengthwise of their respective shafts, the gear 18 being connected to the power driven shaft 22' which corresponds to the shaft 22 of the form of the invention illustrated in Figures 1 to 4 inclusive. The shaft 22' may be connected to a source of power, such as the motor of a motor vehicle, thus making that part of the combined unit which comprises the gears 18 and 16 the pump element of the unit.

The gear 18' is connected to a shaft 140, constituting an element of the mechanism to which power is to be transmitted, such, for example, as the driving shaft of a motor vehicle.

As in the form of the invention illustrated in Figures 1 to 4 inclusive, the sheath 36 for the gear 18 is adapted to slide over the gear 18 to cover or uncover more or less of the piston faces of the teeth 38 of the gear 18, a tongue 44 on block 48' entering the groove 42 in the sheath 36 to cause the sheath 36 to move with the block 48'. Similarly, a sheath 36' for the gear 18' has a groove 42' engaged by a tongue 44' on the block 48' so that the sheath 36' also moves with the block 48'.

From the foregoing description, it will be seen that when the block 48' moves downwardly in Figure 5 of the drawings both the sheath 36 and the sheath 36' will move downwardly with it, thus uncovering more of the piston faces of the teeth 38 of the gear 18 and covering up more of the piston faces of the teeth 38' of the gear 18'. At the same time the gear 16 will be moved out of its sheath 30 thus uncovering more of the piston faces of the teeth 40 of this gear and the gear 16' will be moved into its sheath 30' thus covering up more of the piston faces of the teeth 40'. The result will be that as the volumetric capacity or displacement of the pump, made up of the gears 16 and 18, is increased there will be a corresponding decrease in the volumetric capacity or displacement of the motor made up of the gears 16' and 18'. When the block 48' moves upwardly in Figure 5, the reverse operation will take place and the volumetric capacity or displacement of the motor will be increased while the volumetric capacity or displacement of the pump is being decreased. This will provide for a wide variation in adjustment of the speeds at which the motor 16', 18' is driven by the pump 16, 18.

When, for example, a transmission of this type is used in a motor vehicle, it is usually desirable, when the vehicle has reached a certain speed, to effect a direct driving connection between the motor and the vehicle driving shaft, that is, between the shaft 22' here shown and the shaft 140. In order to provide for such direct drive in the embodiment of the invention illustrated in Figures 5 and 6, a clutch is provided, one member of which is connected to the shaft 22' and the other member of which is connected to the shaft 140. As herein shown, the male member 142 of a conical clutch is carried on a sleeve 144 slidable on but keyed to the shaft 22 to turn therewith. At its end remote from the clutch member 42 the sleeve 144 is provided with an annular groove 146, in an enlargement of the sleeve, to receive a collar 148 by which connections may be made to clutch shifting mechanism. The female member 150 of the clutch is formed on the inside of the gear 18'. To provide suitable support on the shaft 140 for the gear 18, to replace that lost by providing the clutch space, the gear 18' has a hub extension 152, keyed to an enlarged end on the shaft 140. Moreover, to prevent endwise movement of shaft 140 an integral rib 154 thereon is received in a corresponding groove in the housing.

Further to insure centering of the clutch members 142 and 150, the end of the shaft 22' may extend into a bearing in the gear 18', the hub 152 of the gear 18' as well as the shaft 140, preferably having a bearing in the transmission housing, as shown.

As shown in Figure 6, assuming the gears 16 and 18 to constitute the pump, the pump has an intake or suction port 156 and a discharge or pressure port 158 and the motor has an intake or pressure port 160 and a discharge port 162. The pressure port 158 of the pump may be connected with the pressure or intake port 160 of the motor by suitable pipe connections.

Because of possible leakage past the moving parts and along the sliding connections it is usually desirable to have the adjustment so made that the displacement of the pump is slightly greater than that of the motor when the two are to be synchronized. For this reason it is preferable not to connect the motor discharge directly to the pump intake but to conduct the liquid from the motor back to the pump through a reservoir, which permits the desired flexibility in operation and which also may contain any necessary make-up liquid.

In Figure 9 of the drawings, a transmission of the type shown in Figure 5 is shown as incorporated in a motor vehicle having the usual differential 164 connected with the rear axles. The hydraulic transmission of the type shown in Figure 5 and indicated by the reference numeral 166, applied to its housing, takes the place of the usual automobile gear shifting transmission. The clutch sleeve 144 of this transmission is shown as having its collar 148 connected to a clutch pedal lever 168 by means of a pin 170 entering a slot 172 in the end of the pedal lever 168 to provide a lost motion connection for purposes hereinafter set forth.

To effect the shifting of the pistons and sheaths of the transmission shown in Figure 5, which includes both a hydraulic motor and a hydraulic pump, a slide 174 is provided which comprises a bracket arm carrying plungers 176 and 178. The plunger 176 engages the outer edge of the segment 54 of the pump part of the transmission and the plunger 178 engages the outer edge of the segment 54' of the motor part of the transmission. With this arrangement it will be seen that if the slide 174 be moved downwardly in Figure 5 the displacement of the pump will be increased at the same time that the displacement of the motor is decreased and that if it be moved upwardly in Figure 5 the displacement of the motor will be increased at the same time that the displacement of the pump is decreased.

The slide 174 is shown in Figure 9 as connected to one arm of the cutch pedal lever 168, fulcrumed at 180, by means of a spring 182 of sufficient stiffness so that when the clutch lever is moved in a clockwise direction as shown in Figure 9 it will first move the slide 174 in a downward direction in Figure 5 against the tendency of a spring 184 to maintain it in a position in which the pump part of the transmission has no capacity at all. This will result in gradually increasing the displacement of the pump part of the transmission and decreasing the displacement of the motor part so that the shaft 22' will begin to drive the shaft 140 through the hydraulic connections, the speed of drive gradually increasing as the ratio of displacement of the pump part of the transmission to that of the motor part of the transmission is increased. This movement of slide 174 will continue until the stop member 186 on the slide 174 engages the adjustable stop 188 on the vehicle frame, this stop being adjusted to stop the slide 174 at the point at which the speed of the driving shaft 140 is substantially identical with the speed of the driving shaft 22' or, in other words, at the point where the pump and motor are rotating at the same speed. The lost motion connection provided by the pin 170 and slot 172 in the longer arm of the clutch pedal lever 168 permits this initial movement of the lever 168 to effect the change in ratio of the displacements of the pump and motor without movement of the clutch collar 148 to effect the engagement of the clutch member 142 with the clutch member 150. Further movement of the clutch pedal lever 168 in a clockwise direction will, however, engage the pin 170 with the left hand end of the slot 172 and effect the movement of the clutch member 142 into engagement with the clutch member 150, this engagement occurring after the shaft 22' and the shaft 140, to which the respective clutch members are connected, reach the same speed. A positive driving connection between the motor 190 and the driving shaft 192 is thus made.

In Figure 4 of the drawings is illustrated in detail one mode of connecting the block 48 to the gear 16 for axial movement together while permitting the gear 16 to turn freely. Roller bearings 17 facilitate free turning of gear 16. As shown in Figure 4, the block 48 is provided with a flanged hub extension 194 which provides a groove in which a split ring 196 may be received, the split ring 196 being countersunk in the side face of the gear 16 and secured therein by screws 198, the heads of which are received in countersinks in the split ring 196. The flanged hub 194 of the block 48 is received in a recess in the gear 16 of sufficient depth to permit the face of the main part of the block to fit close against one face of the gear. To permit access to the screws 198 for connecting the gear 16 to or detaching it from the block 48, openings 200 are provided through the block 48 which are closed against flow of the transmission liquid therethrough by screw plugs 202.

In Figure 8 is shown one method of securing the block 48' and the two gears 16 and 16' on the hollow shaft 20' in the form of transmission shown in Figure 5 of the drawings. In this case the hollow shaft 20' is threaded at each end and the block 48' and the gears 16 and 16' are confined thereon by nuts 204 and 206 received in recesses in the gears 16 and 16', the gears being free to turn on the hollow shaft 20' while the block 48' is held against rotation.

As hereinabove suggested, the connection between the discharge of the motor and the intake of the pump in the form of the invention shown in Figure 5 of the drawings is preferably not a direct connection but through a storage reservoir such, for example, as the reservoir 210 shown in Figure 9.

Although the lever 168 is shown and described as a pedal lever, the movement thereof, of course, can be effected in any other manner. Moreover, although it is shown as moved positively into clutch engaging position, it will be understood that it can be arranged, as in the ordinary motor vehicle, to be spring-impelled into clutch engaging position and moved positively into clutch-releasing position, this movement carrying the slide 176 into the position in which it causes the pump capacity to be reduced to zero.

From the foregoing description it will be seen that the invention provides simple, positive and easily operable means for effecting any desired variations in the volumetric capacity or displacement of either a hydraulic pump or a hydraulic motor of the well-known and extensively used gear type. It will further be seen that the construction has a minimum of movable parts and of parts subject to wear, that its action is positive and that the variation effected is of definitely equal amounts in respect to both of the intergeared pistons.

What is claimed as new is:

1. In a hydraulic transmission, the combination with a rotary hydraulic pump or motor having two rotary intergeared pistons, each provided with a close-fitting sheath relatively slidable axially to expose in effective position more or less of the piston faces, an enclosing casing having intake and discharge ports and in which bearings for said pistons are supported, said casing providing space for simultaneous axial movement of one sheath while its piston maintains its position in said casing and axial movement of the other piston while its sheath maintains its position in said casing, thereby to permit simultaneous covering or uncovering of equal effective areas of the piston faces of the two pistons, of a second hydraulic pump or motor of the same type which has its axially movable piston connected to and movable axially with but rotatable independently of the axially movable piston of the first pump or motor and has its axially movable sheath connected to and movable axially with but rotatable independently of the axially movable sheath of said first pump or motor.

2. A hydraulic transmission comprising a gear pump and a gear motor, a common housing in which said pump and motor are enclosed, with the respective gears of the two arranged coaxially, a sheath associated with each of said gears, the sheaths for one pair of coaxial gears being held against axial movement and the gears being axially movable together to sheath more of the pump gear and to unsheath more of the motor gear and vice versa, the other pair of coaxial gears being held against axial movement and the sheaths therefor being axially movable together to sheath more of the pump gear and to unsheath more of the motor gear and vice versa, said axially movable gears and axially movable sheaths being interlocked for axial movement together, whereby the volumetric capacities or displacements of the pump and motor may be varied simultaneously in opposite directions.

3. A hydraulic transmission according to claim 2 in which the non-axially movable pair of coaxial gears are respectively connected to a driving shaft and a shaft to be driven.

4. A hydraulic transmission according to claim 2 in which the non-axially movable coaxial gears are connected, one to a driving shaft and the other to a shaft to be driven, and in which relatively movable clutch members are provided for clutching said shafts together when they have reached the same speed of rotation.

5. A hydraulic transmission according to claim 2 in which means extending to the exterior of the housing is provided for effecting simultaneous axial movement of the axially movable sheaths and of the axially movable gears.

6. A hydraulic transmission according to claim 2 in which by-passes permit displacement of operating liquid from one side of the axially movable parts to the other when varying the relative overall volumetric capacities or displacements.

7. In a hydraulic transmission, the combination with a rotary hydraulic pump or motor having two rotary intergeared pistons each provided with a close-fitting sheath relatively slidable axially to expose in effective position more or less of the piston faces, an enclosing casing having intake and discharge ports and in which bearings for said pistons are carried, said casing providing space for simultaneous axial movement of one sheath while its piston maintains its position in said casing and axial movement of the other piston while its sheath maintains its position in said casing thereby to permit simultaneous covering or uncovering of equally effective areas of the piston faces of the two pistons, of a second hydraulic motor or pump of the same type hydraulically connected to said first pump or motor to be driven by or to drive said first pump or motor, said second motor or pump having its axially movable piston connected to and movable with but rotatable independently of one of the axially movable parts of the first pump or motor and having its axially movable sheath connected to and movable with but rotatable independently of the other axially movable part of said first pump or motor.

MORRIS B. CARROLL.

REFERENCES CITED

The following references are of record in the file of this patent:

UNITED STATES PATENTS

| Number | Name | Date |
| --- | --- | --- |
| 711,662 | Herdman | Oct. 21, 1902 |
| 788,848 | Riegel | May 2, 1905 |
| 815,522 | Fraser | Mar. 20, 1906 |
| 1,647,621 | Hawley | Nov. 1, 1927 |
| 1,742,215 | Pigott | Jan. 7, 1930 |
| 1,870,824 | Shepard | Aug. 9, 1932 |
| 2,052,419 | Moore et al. | Aug. 25, 1936 |
| 2,079,375 | McCollum | May 4, 1937 |
| 2,149,326 | Wilkin | Mar. 7, 1939 |

FOREIGN PATENTS

| Number | Country | Date |
| --- | --- | --- |
| 448,953 | Great Britain | June 18, 1936 |
| 511,495 | Germany | Oct. 30, 1930 |